(12) United States Patent
Jin et al.

(10) Patent No.: US 7,151,937 B2
(45) Date of Patent: *Dec. 19, 2006

(54) METHOD AND SYSTEM FOR REDUCING WIRELESS MULTI-CELL INTERFERENCES THROUGH SEGREGATED CHANNEL ASSIGNMENTS AND SEGREGATED ANTENNA BEAMS

(75) Inventors: Hang Jin, Plano, TX (US); Weidong Yang, Plano, TX (US)

(73) Assignee: Navini Networks, Inc., Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/326,180

(22) Filed: Jan. 4, 2006

(65) Prior Publication Data

US 2006/0258362 A1 Nov. 16, 2006

Related U.S. Application Data

(63) Continuation-in-part of application No. 11/125,684, filed on May 10, 2005, now Pat. No. 7,062,276.

(51) Int. Cl.
H04Q 7/20 (2006.01)

(52) U.S. Cl. ............ 455/450; 455/446; 455/447; 455/448

(58) Field of Classification Search ........ 455/446–448, 455/440, 63, 443, 453, 464, 62, 450, 1; 370/329
See application file for complete search history.

(56) References Cited

U.S. PATENT DOCUMENTS 7,062,276 B1 * 6/2006 Xu et al. .......... 455/450

* cited by examiner

Primary Examiner—George Eng
Assistant Examiner—Marcos L. Torres
(74) Attorney, Agent, or Firm—Preston Gates & Ellis LLP

(57) ABSTRACT

A wireless communication system is disclosed. An available frequency spectrum is divided into multiple channels, a first wireless communication coverage unit is then segregated into a first number of geographical segments. After the segregated channels are grouped into a second number of channel blocks, each channel block is assigned to the segregated geographical segments with predetermined priorities. The above steps are repeated in a fashion that the channels in different channel blocks exhibit no higher mutual interference than the channels in the same channel block, and the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum.

15 Claims, 9 Drawing Sheets

METHOD AND SYSTEM FOR REDUCING WIRELESS MULTI-CELL INTERFERENCES THROUGH SEGREGATED CHANNEL ASSIGNMENTS AND SEGREGATED ANTENNA BEAMS

This is a Continuation-In-Part Application of U.S. patent application Ser. No. 11/125,684 filed May 10, 2005 now U.S. Pat. No. 7,062,276 entitled "Method and System for Reducing Wireless Multi-Cell Interferences through Segregated Channel Assignments and Segregated Antenna Beams."

FIELD OF THE INVENTION

This invention relates generally to wireless communication systems, and more particularly to a method and system for reducing multi-cell interferences in the wireless communication systems.

BACKGROUND

In cellular telephone or other wireless voice or data systems, a served area is divided into cells, each of which may be further divided into sectors. Each cell may be served by a single base transceiver station ("BTS"), which is further connected to a mobile switch center ("MSC"), a subscriber management system ("SMS"), or a data router via a base station controller ("BSC"). A plurality of wireless communication devices/terminals are connected to the MSC, or the SMS, the router by establishing radio links with one or more nearby base stations.

In the earlier cellular telephone technology, such as time division multiple access ("TDMA"), as a wireless communication terminal travels from one cell to another, the radio link between the terminal and the base station serving the first cell had to be broken and then replaced by a radio link between the terminal and the base station serving the second cell. In contrast, in a code division multiple access ("CDMA") cellular telephone system, because the same frequency band is used for all cells and sectors, the first link need not be broken before connecting with the second link. Moreover, the CDMA waveform properties which provide processing gain are also used to discriminate between signals that occupy the same frequency band. A wireless communication terminal thus need not switch frequencies when a call is transferred from one cell or sector to another.

Multi-cell interferences in wireless systems occur when signals, either from the BTS or terminals, spill over to its neighboring cells and interfere with the operation of the neighboring cells' BTS or terminals therein. Consequently, the multi-cell interference is recognized as one of the major factors that impair the performance of wireless communication systems by limiting both the capacity and coverage of the wireless communication systems.

Various conventional methods for reducing multi-cell interferences that are known in the industry include applying a pseudo random noise (PN) offset, a frequency offset, and using directional antennas at the terminal. All of these methods try to separate the wireless signals in a particular cell from neighboring cells far apart to eliminate or reach a minimum tolerable interference level.

The PN offset method is mainly used in spreading spectrum communication systems. Although it does not reduce the interference signals, it spreads the interference signals over a wider spectrum and makes them behave like thermal noises. Using the PN offset method, the maximum isolation between neighboring cells varies depending on the system spreading gain.

The frequency offset method uses different frequencies for different cells. The major drawback is that it significantly reduces the spectrum usage efficiency since the implementation of that depends on the frequency reuse. For example, as it is understood in the industry, if a frequency reuse factor is chose to be 3, the spectrum usage efficiency is also reduced by a factor of 3.

Finally, by arranging the directional antenna to point to a particular direction, signals from one particular cell will be enhanced while signals from other cells are suppressed. However, the directional antenna is traditionally bulky and expensive, and thus renders it impossible or impractical to equip the handheld wireless terminals therewith.

What is needed is an improved method and system for effectively reducing multi-cell interferences for achieving better communication quality.

SUMMARY

A method and system is disclosed for reducing multi-frequency signal interference in a wireless communication network. An available frequency spectrum is divided into a plurality of channels, a first wireless communication coverage unit is then segregated into a first number of geographical segments. After the segregated channels are grouped into a second number of channel blocks, each channel block is assigned to at least one of the segregated geographical segments with predetermined priorities. All the above steps are repeated for each neighboring wireless communication coverage unit of the first wireless communication coverage unit, wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum. The present invention achieves the goal of significant reduction of multi-cell interference in a wireless communication network by making proper assignment of different kinds of communication channels to different terminals located at different geographical locations.

When a wireless terminal accesses a particular cell of the wireless communication network implemented with the technology disclosed by the present invention, the entry location of the terminal is first detected through different means. In one example, the geographical segment that the terminal is in is determined via a message sent back from the terminal. Other techniques involved utilizing the time of the arrival ("TOA") of the desired signal received or the path loss information corresponding to or from the BTS to the terminal. In another example, multiple antennas are used, and the location of the terminal is determined based on the information about the direction of the arrival ("DOA") of a desired signal received. Once the location of the wireless terminal is determined, the terminal is assigned with one or more frequency channels associated with that geographical segment where it locates. Future communication signals intended for that terminal will be sent only to its segment through the assigned frequency channels.

DESCRIPTION

Although the present invention is illustrated below with regard to a few limited examples, it is understood that the present invention is applicable to any multiple access technologies which implement frequency division for multiple access channelization. Such access technologies include Frequency Division Multiple Access (FDMA), Time Division Multiple Access ("TDMA"), Multi-Carrier Code Division Multiple Access ("MC-CDMA"), and Orthogonal Frequency Division Multiplex Multiple Access ("OFDM-MA") and any combination thereof, whether synchronized or unsynchronized, using Frequency Division Duplex ("FDD") or Time Division Duplex ("TDD"). The description below with regard to examples of the present invention may be cast in the context of MC-SCDMA systems where the channels with more isolation are the channels in different subcarriers and the channels with less isolation are defined as code channels in the same subcarrier. Obviously, the same concept can be extended to TD-SCDMA systems where the code channels in the same time slot are involved. The same is true for OFDM-MA systems where the frequency components with more separation are considered to have more isolation and the frequency components with less separation are considered to have less isolation.

Figure 1:
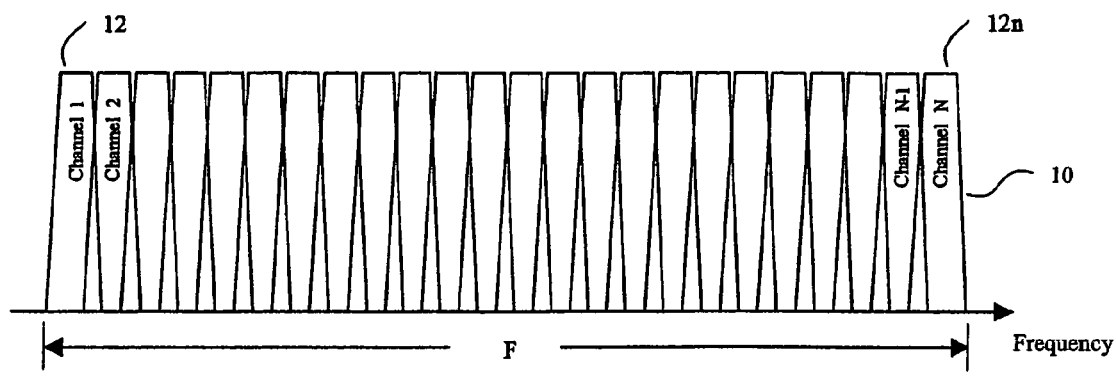
FIG. 1 illustrates a frequency spectrum used by a wireless communication coverage unit in a wireless communication network.

FIG. 1 illustrates a frequency spectrum allocated for a communication coverage unit such as a cell in a communication system. When using a frequency division channelization, it is assumed that the total frequency spectrum F is allocated for the cell, which is further divided into N subcarriers. In MC-SCDMA, multiple users share a single subcarrier by using different orthogonal codes. Typically, a base transceiver station (BTS) situated at the center of each cell is responsible for communicating with all wireless terminals within the boundaries of the cell.

Figure 2:
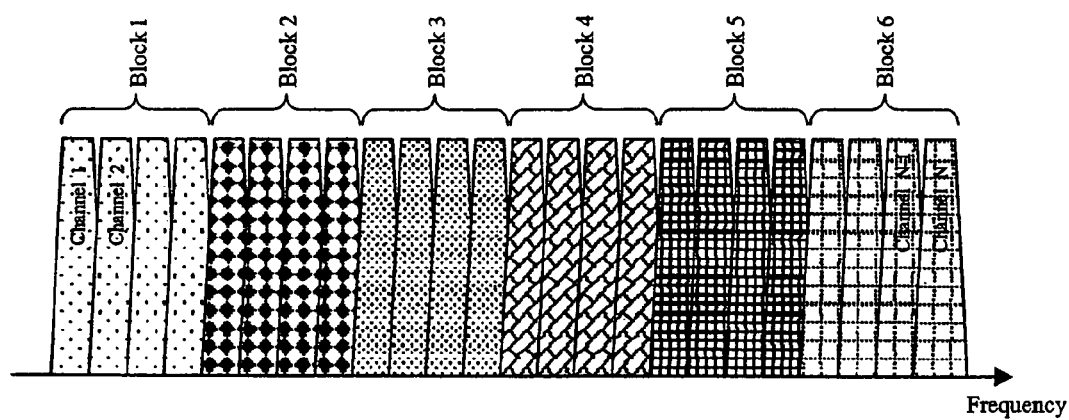
FIG. 2 illustrates the frequency spectrum of FIG. 1 divided into frequency blocks according to one example of the present invention.
Figure 3:
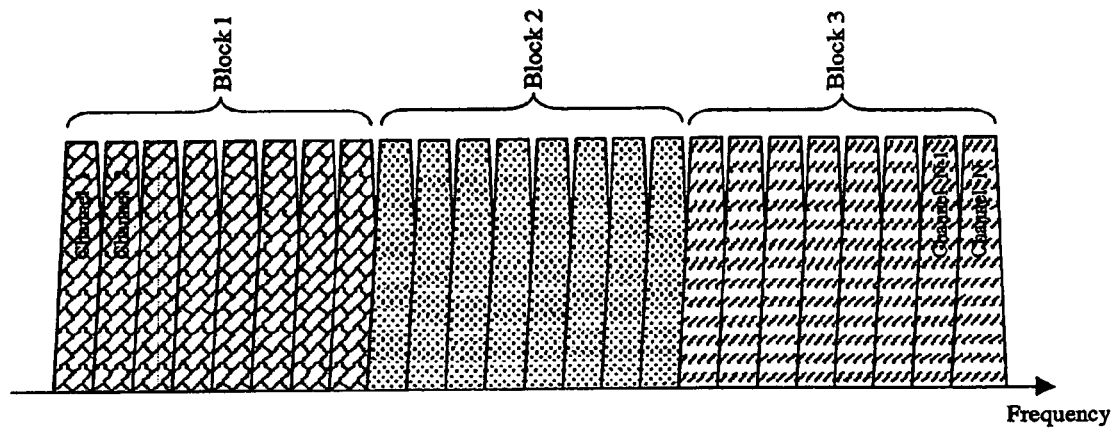
FIG. 3 illustrates the frequency spectrum of FIG. 1 divided into frequency blocks according to another example of the present invention.
Figure 4:
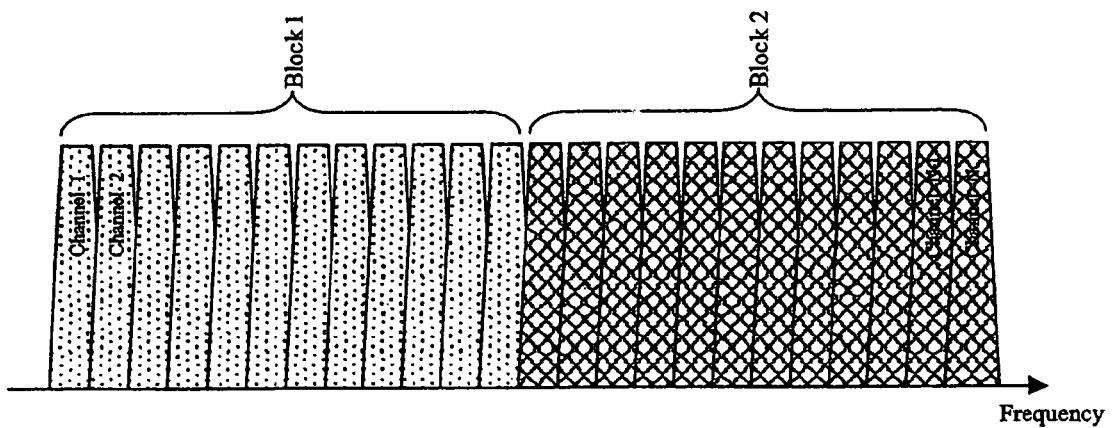
FIG. 4 illustrates the frequency spectrum of FIG. 1 divided into frequency blocks according to another example of the present invention.

FIG. 2 illustrates channel assignment within a cell according to one example of the present invention. For example, as shown, the frequency channels are divided into a plurality of unique blocks (e.g. Block 1–6). Similarly, FIG. 3 illustrates that the frequency channels are divided into three blocks each containing 7 channels according to another example of the present invention. Likewise, FIG. 4 illustrates that the frequency channels are divided into 2 unique blocks each having 12 channels according to another example of the present invention. It is understood that the number of blocks and the number of channels included in each block are determined according to the design of a particular communication system.

Figure 5:
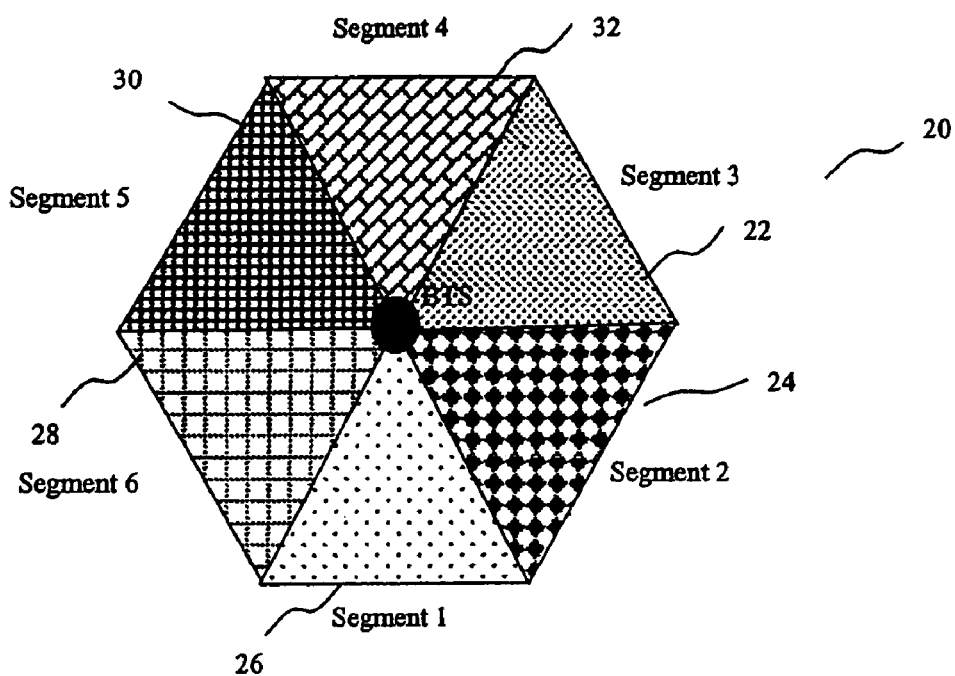
FIG. 5 illustrates the communication coverage area being segregated into geographical segments according to one example of the present invention.

FIG. 5 illustrates a geographical segregation of each cell which breaks the cell into one or more segments. In this configuration, the cell is "radially" divided into six segments, each having a polygon shape (e.g., a triangle in this case). After the cell is segregated into multiple segments, a unique frequency block as determined and shown in FIG. 2 is assigned to each of the segments as its primary channels. In this case, the channel assignment is completed by assigning Block 1 to Block 6 of FIG. 2 to the six segregated segments (i.e., Segments 1–6). The relationship between the assigned primary channels between any two segments depends on the distance between them. As shown, for each segment, there are two neighboring segments. Segment 1 has both Segment 2 and Segment 6 as its immediate neighboring segments. The primary channels of these immediate neighboring segments are considered as its secondary primary channels. However, the relevancy of the primary channels of other segments diminishes for Segment 1 since it is less likely to have direct interference from them. For example, the assigned primary channels of Segments 3 and 5 will be the third primary channels and the primary channels of Segment 4 will be the fourth primary channels for Segment 1.

Figure 6:
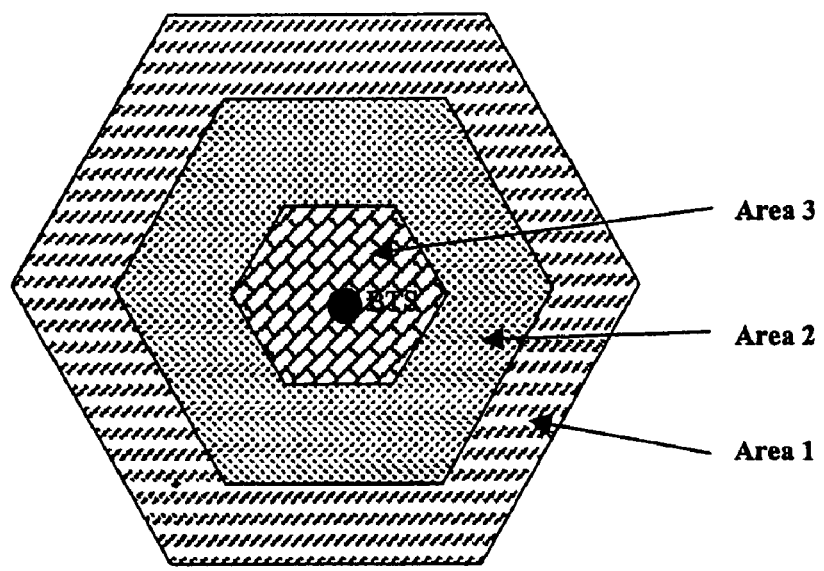
FIG. 6 illustrates the communication coverage area being segregated into geographical segments (e.g., nested hexagons) according to another example of the present invention.

FIG. 6 illustrates a geographical segregation of a cell which breaks the cell into one or more nested co-centric polygon areas in another example of the present invention. In this case, the polygon areas are hexagons since the typical shape of the cell is a hexagon. Although not shown, it is also possible to use co-centric circles instead of polygon areas. After the cell is segregated into multiple nested areas (Areas 1–3), a unique frequency block as determined and shown in FIG. 3 is assigned to each of the areas as its primary channels. In this case, the channel assignment is completed by assigning Blocks 1–3 to Areas 1–3 respectively.

As shown above with regard to FIGS. 5–6, with the cell segregation and channel assignment, multi-cell planning is implemented so that minimum frequency overlap at cell boundaries is achieved. For planning a multi-cell deployment, the primary channels of each segment of a particular cell are designed to be different from a segment of another cell that borders thereon.

Figure 7:
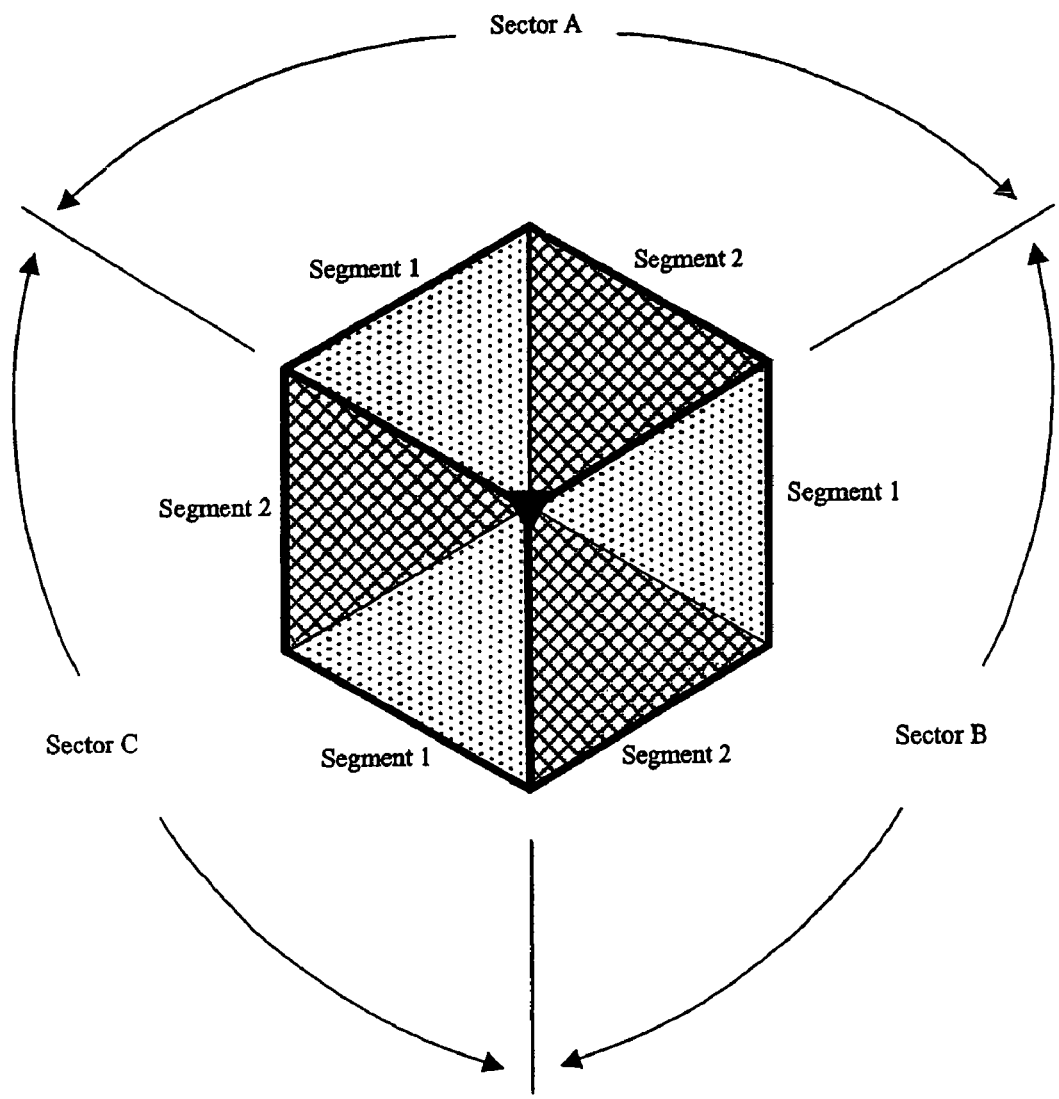
FIG. 7 illustrates the communication coverage area being segregated into geographical segments (e.g., sectorized cell) according to another example of the present invention.

FIG. 7 illustrates a sectorized cell which has three sectors A–C in another example of the present invention. Each sector is then geographically segregated into one or more segments. A unique frequency block as determined and shown in FIG. 4 is assigned to each of the segments as its primary channels. In this case, the channel assignment is completed by assigning Block 1 and Block 2 to Segment 1 and Segment 2.

Figure 8:
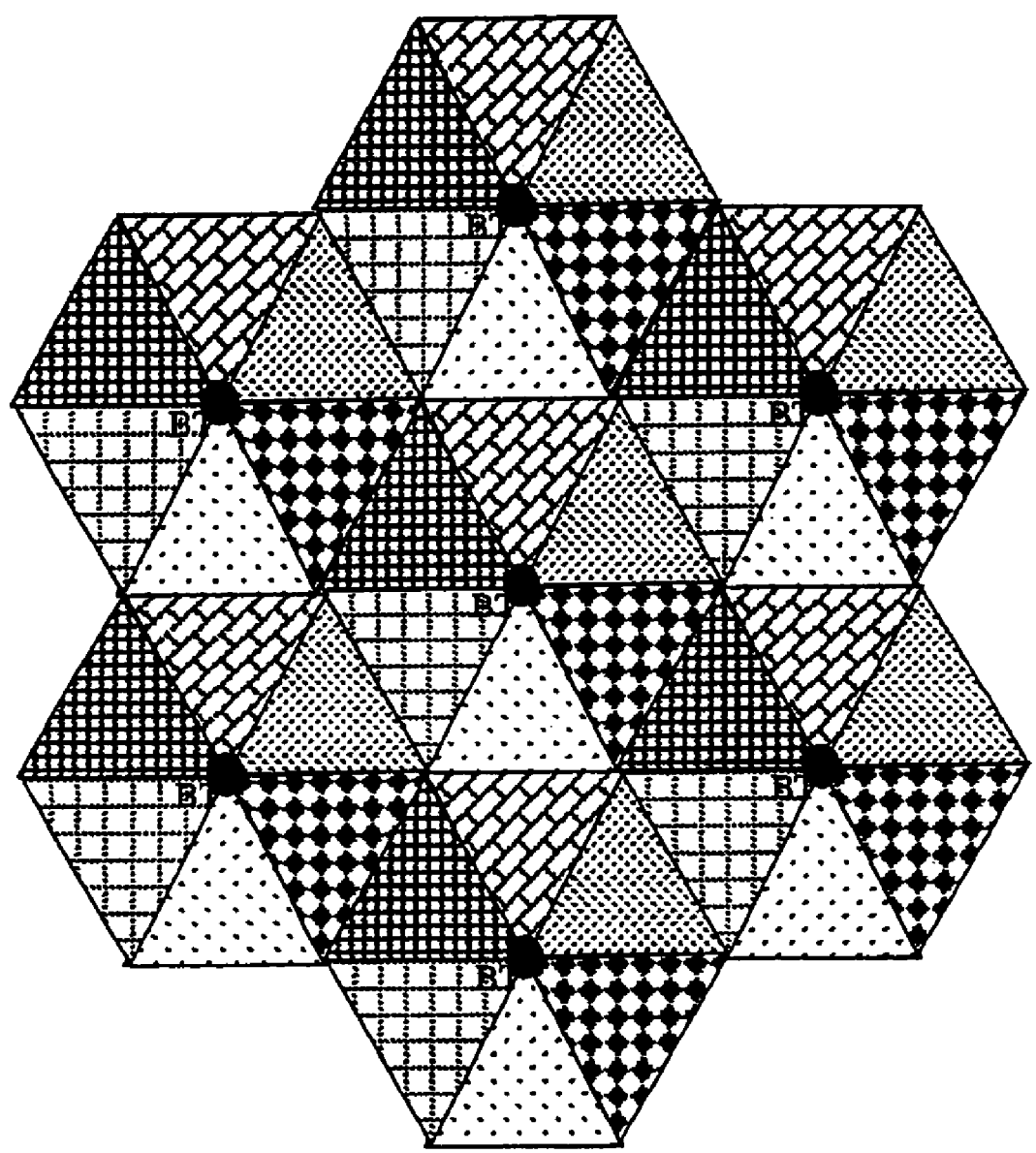
FIG. 8 illustrates a schematic view of multiple wireless communication coverage units of the wireless communication network with frequency channel assignments arranged to minimize multi-cell interference according to one example of the present invention.
Figure 9:
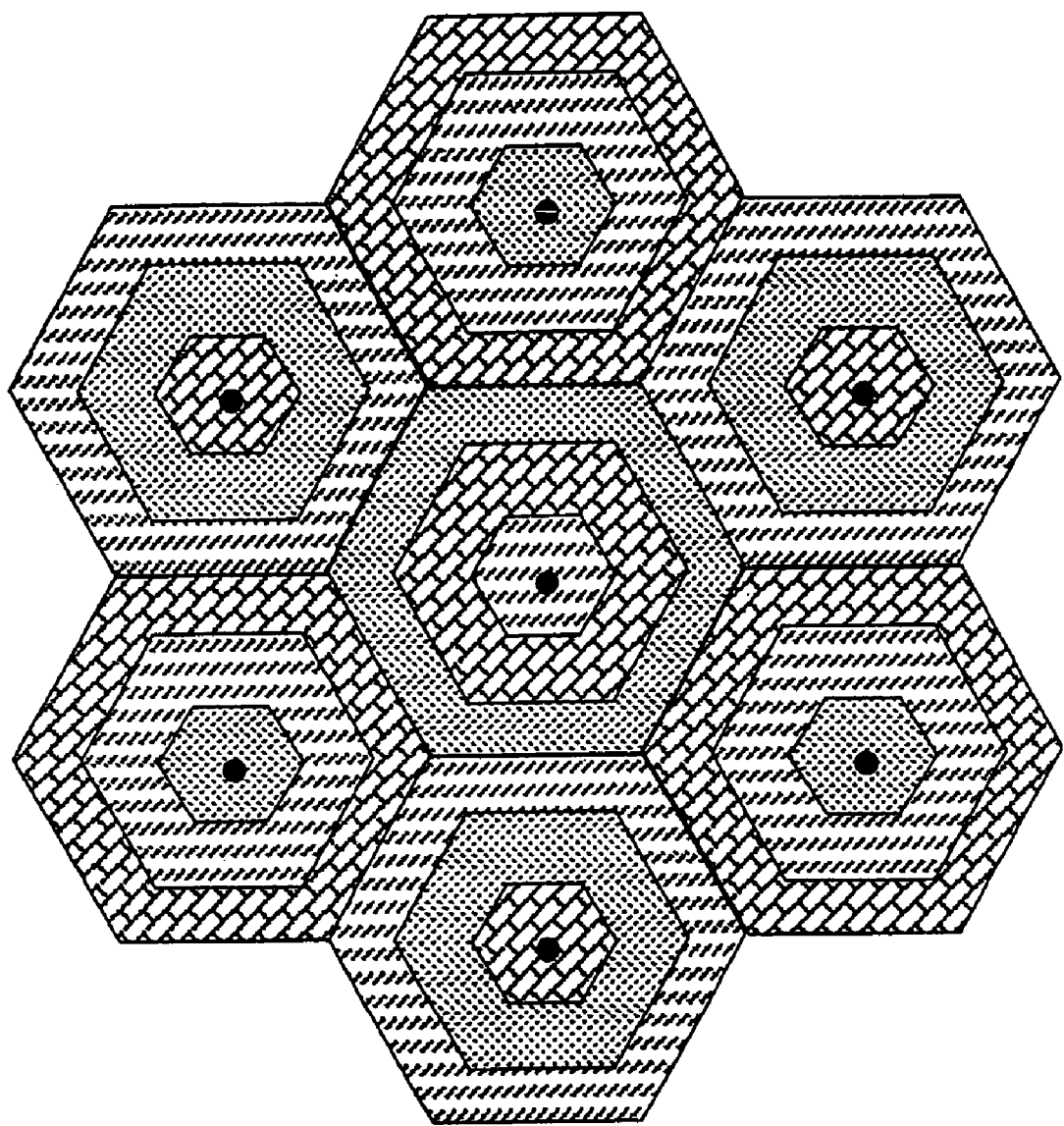
FIG. 9 illustrates a schematic view of multiple wireless communication coverage units of the wireless communication network with frequency channel assignments arranged to minimize multi-cell interference according to another example of the present invention.
Figure 10:
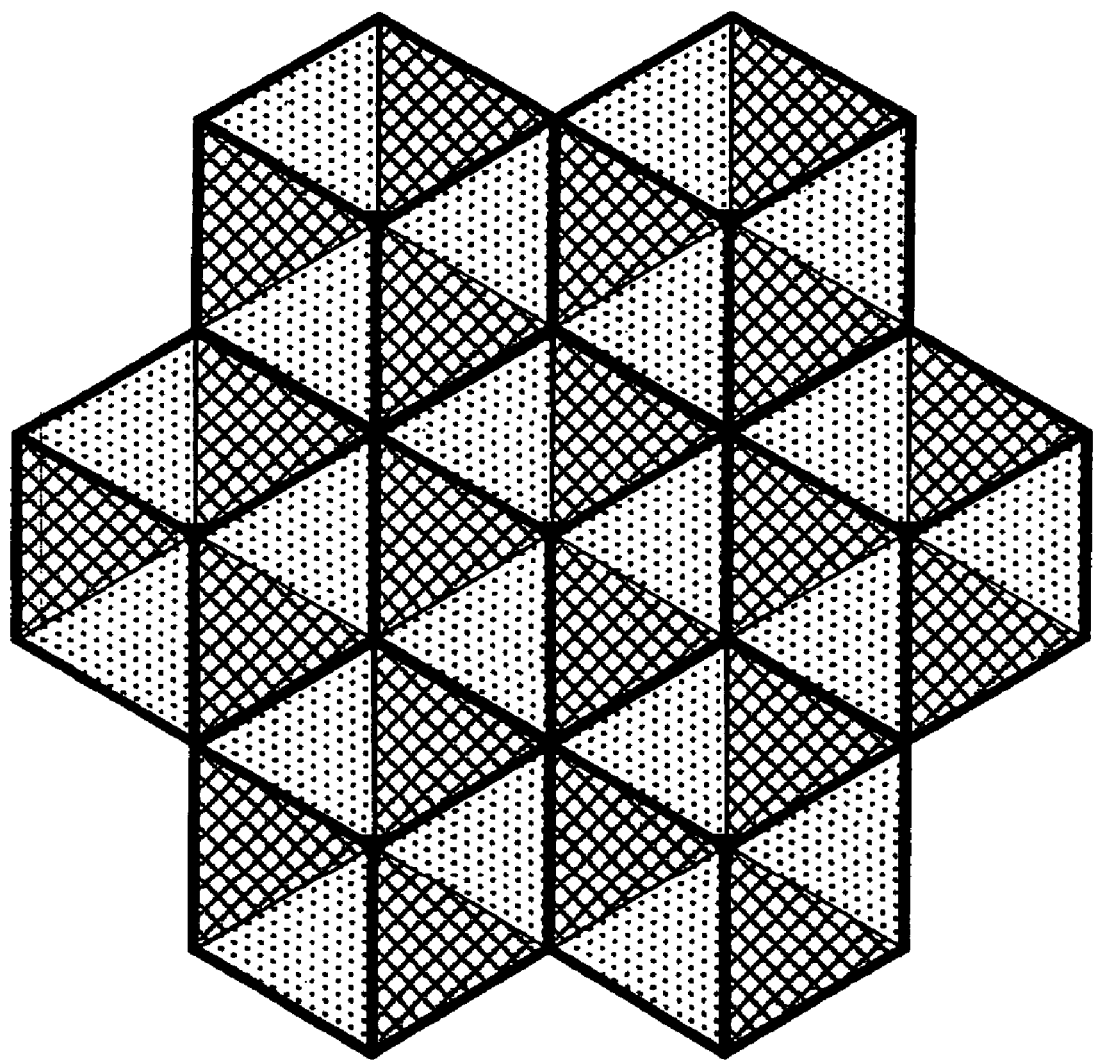
FIG. 10 illustrates a schematic view of multiple wireless communication coverage units of the wireless communication network with frequency channel assignments arranged to minimize multi-cell interference according to another example of the present invention.

FIG. 8 illustrates an overview of a multiple cell planning for cells with 6-segment segregation corresponding to the configuration shown in FIG. 5. FIG. 9 is another overview of a multiple cell planning for cells corresponding to the configuration shown in FIG. 6. Similarly, FIG. 10 is another example of the present invention corresponding to the configuration shown in FIG. 7. One commonality shown by all three FIGS. is that no two segments sharing the same frequency block will be arranged to border on each other. This is clearly indicated graphically by different patterns applied to the cells in FIGS. 8, 9, and 10. Moreover, while assigning the channel blocks to the geographical segments, the channel blocks having a higher likelihood of mutual interference are separated farther apart to minimize the multi-cell signal interferences.

Although FIGS. 1–7 illustrate segregation of a cell with particular numbers of segments and different shapes, it is understood that variations thereof are fully contemplated based on two principles. One, the primary channels of immediately neighboring segments ought to be set apart as far as possible. Two, to fully use the frequency spectrum available, the spectrum is divided in blocks of appropriate numbers so that they will be easily applied to geographically segregated segments of the cell.

Once the multi-cell planning is accomplished in the wireless communication network, it is important to identify the location of a new wireless terminal that enters the cell in order to assign appropriate channels thereto. The approaches used to identify the location of new terminals vary depending on how the cells are segregated. A few examples are explained below directed toward the configurations as shown above with regard to FIGS. 5–10.

In the examples shown above in FIGS. 5 and 7, where the cell is segregated into segments along redial direction, the identification of terminal location can be accomplished by one of the following approaches.

Figure 11:
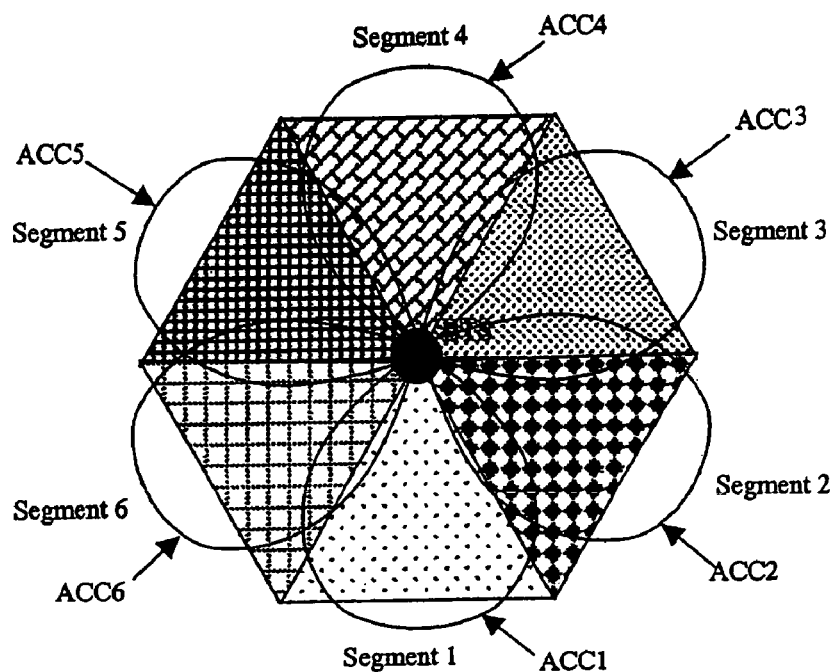
FIG. 11 illustrates a beam forming design overlaying on a wireless communication coverage unit according to one example of the present invention.

FIG. 11 illustrates a segregated access code channel (ACC) used for identifying user access by using multiple antennas at the BTS in one example of the present invention. That is, the wireless communication system uses different ACCs for different segments. One antenna is assigned to an ACC to cover one segment.

Figure 12:
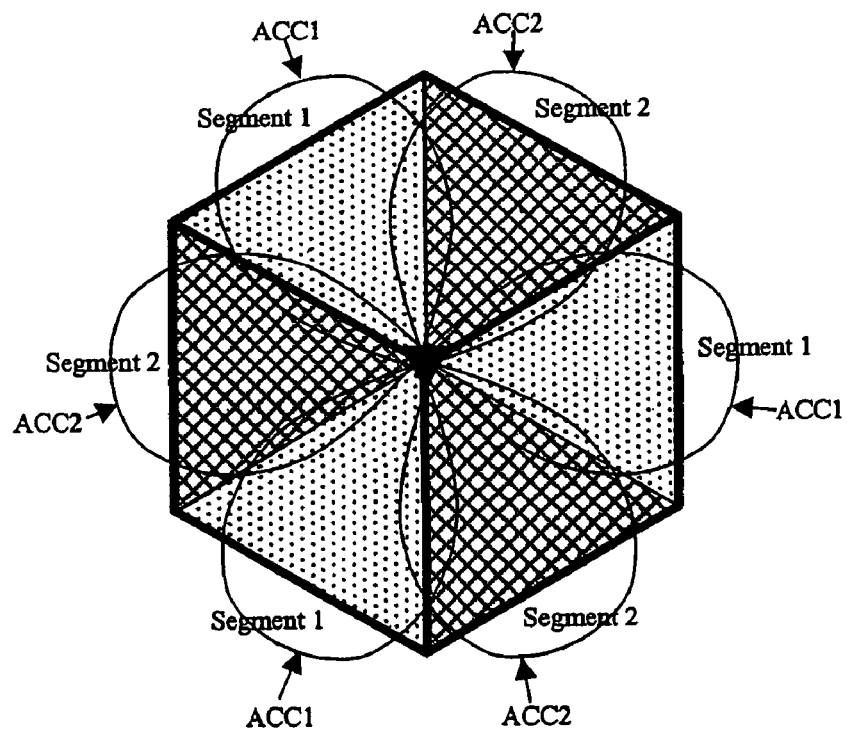
FIG. 12 illustrates a sectorized cell design where each antenna sector covers 120 degrees of the cell which is further separated into two frequency blocks according to one example of the present invention.

FIG. 12 illustrates a configuration with segregating antenna subsectors within each cell for identifying user access. In this example, each antenna sector covers 120 degree of the cell which is further separated into two frequency blocks each covering a 60 degree subsector. The subsector coincides with a particular segment of the cell using a predetermined ACC wherein the bordering subsectors are non-interfering channels. Unlike the configuration in FIG. 11, two ACCs can be used repetitively for the same cell.

In another example, an adaptive antenna array can be used at the BTS wherein proper ACC patterns can also be generated by implementing adaptive beam-forming, thereby distinguishing one ACC covering a segment from its bordering ACCs.

The ACCs for different segments can also differ in any one of the ACC physical attributes such as carrier frequency, phase, magnitude, time delay, or PN offset if it is masked by a PN code.

With this infrastructure in place, when a wireless terminal is accessing the wireless communication system, it will scan a system access channel and acquire an appropriate ACC. Once the ACC channel is captured by the terminal, it sends a communication message back to the BTS which contains the ACC information that it has acquired. At the BTS, the ACC information sent by the terminal is compared with the known ACC planning map, and the segment that the user locates is detected immediately.

In another example, in order to identify the location of (or more specifically, the segment of) the new terminal, a beam selection method is used. In essence, for each segment, the BTS uses an exclusive antenna with an exclusive antenna pattern that covers that segment only. Although the signal sent by the terminal is received by multiple segments, the segment with the maximum desired signal received at the designated antenna is most likely the one where the terminal locates.

In another example of the present invention, the direction of arrival (DOA) of an uplink signal is used to identify the location of the wireless terminal even though the ACC is broadcasting omni-directionally since the BTS could use multiple antennas (or an adaptive antenna array) for transmitting and receiving signals. When the terminal is accessing the wireless communication system, the BTS is able to compute its DOA based on the magnitudes and phases of the signals received on different antennas. From its DOA, the segment that the wireless terminal is in will be determined.

In another example of the present invention as shown in FIG. 6 where the cell is segregated into nested polygon areas, the terminal location can be determined based on the time duration for a desired signal to travel between the BTS and a wireless terminal or the signal strength. These techniques are well known in the industry.

After the segment that the terminal is in has been determined through the techniques described above, the BTS classifies traffic code channels ("TCCs") based on a channel assignment priority hierarchy such as the following:
 (1) Primary channels
 (2) Secondary primary channels
 (3) Third primary channels
 (4) Fourth primary channels and so forth.

The channel assignment priority hierarchy is also to assist reducing possible interferences. After the terminal's segment has been determined and the frequency channels have been assigned accordingly, the BTS transmits communication signals that are intended for the terminal only to the segment or area where the terminal locates based on the design of the wireless communication system. For example, in the example as shown in FIGS. 5 and 7 where the cell is segregated into segments along radial direction, the BTS transmits communication signals that are intended for the terminal only to the segment where the terminal locates through beam forming. This beam forming process can be accomplished by various methods. For instance, for different segments, the BTS uses different antennas with a unique beam radiation pattern that is exclusively designed for the segment. Depending on where the terminal locates, the BTS selects a particular antenna or antenna set to transmit signals. In another example, the BTS could use multiple antennas (antenna array) for the communications. When transmitting a signal, the BTS sends the signal to multiple antennas with different magnitudes and phases to make them combine in the air and form a directive beam to the destination segment. The magnitudes and phases of the transmitted signals for different antennas can be calculated based on the magnitudes and phases of the desired signals received at different antennas from the wireless terminal.

In another example, in case the system is designed as shown in FIG. 6, where the cell is segregated into nested polygon areas (in this case, hexagon areas), the BTS first calculates a path loss between the terminal and the BTS, then sends the signal destined for the terminal with just sufficient power to overcome the path loss and maintain a good signal-to-noise ratio for signal reception. In a similar way, the terminal sends a signal to BTS with just sufficient power to overcome the path loss and maintain a good signal-to-noise ratio for signal reception. The power of up and down links can be determined by using an open or close loop control scheme. By maintaining the communication this way, the BTS understands where the wireless terminal is in the nested polygon areas.

Although the present invention is described above with respect to a few examples, it is understood that the present invention is a generic multi-cell interference reduction technique based on segregated channel assignments, segregated antenna beams, and power control. It is applicable to any multiple access technologies that implement frequency division for multiple access channelization as mentioned above. Many communication systems use one or a combination of multiple access schemes, such as multiple-carrier-synchronous-code-division-multiple-access (MC-SCDMA), wherein one carrier is subdivided into a number of subcarriers and in each subcarrier, there are multiple CDMA signals, each of which is assigned to one of a set of orthogonal codes. Obviously, different multiplex schemes and different channel separations have different co-channel interference. For example, in MC-SCDMA systems, the interference among different subcarriers are normally much less than the interference among different code channels in the same subcarrier. Since all the terminals communicating with the BTS are typically distributed in different geographical locations, this fact contributes to minimizing the interference among different cells or among different terminals in the same cell.

Compared to conventional methods, the present invention enjoys various advantages. For example, the present invention takes advantage of the spatial diversity of terminals and significantly reduces the multi-cell interference, while at the same time maintaining high spectrum usage efficiency. In particular, unlike the PN offset technique, its interference reduction efficiency is not limited by the system spreading gain. Furthermore, it can be used with the PN offset technique to further reduce the multi-cell interference. For example, a PN offset network assignment can be implemented so that no direct adjacent cells share the same PN offset. Then, implementing the segregated channel scheme as described above further assures that there are no same frequencies at the boundaries of directly adjacent cells. Consequently, the interferences from adjacent cells are first reduced due to the frequency channelization and further reduced by the PN orthogonality.

Comparing to the frequency offset technique, the present invention achieves the same multi-cell interference reduction efficiency but sacrifices no spectrum usage efficiency. Taking the example as explained with regard to FIGS. 2, 5, and 8 for illustration where each cell has six segregated segments, the present invention can achieve the same level of interference reduction as a frequency re-use of 6 cell planning, while having the spectrum usage efficiency of frequency reuse of 1 cell. In other words, the present invention increases the spectrum usage efficiency by a factor of 6 while keeping the same multi-cell interference level as implementing a frequency reuse rate of 6. In addition, the present invention does not need any directional antenna at the wireless terminal. Consequently, it does not have the drawback of a directional antenna, namely, bulky, expensive, and limited mobility.

Figure 13:
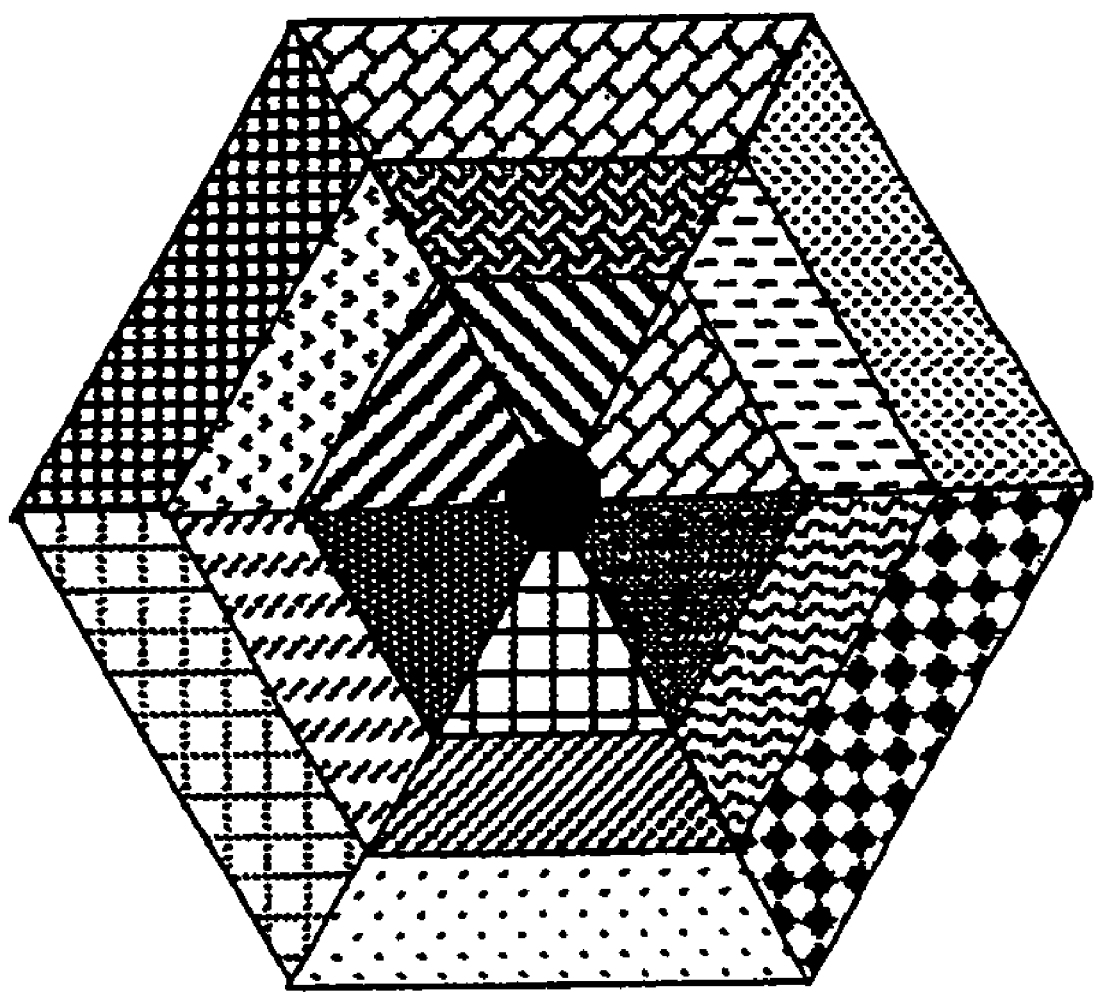
FIG. 13 illustrates a channel assignment design of combined radial and distance segmentations.

The above disclosure provides many different embodiments, or examples, for implementing different features of the invention. Also, specific examples of components, and processes are described to help clarify the invention. These are, of course, merely examples and are not intended to limit the invention from that described in the claims. For instance, the conventional PN offset method can be used in combination with the approach disclosed in this invention. Another example is, as illustrated in FIG. 13, that the cell can be segregated by combining the segregation techniques illustrated in both FIGS. 5–6. In this combined segregation configuration, the cell is divided into 18 areas, and consistent with the disclosure above, the frequency channels used for these areas can be designed to be unique to each other.

While the invention has been particularly shown and described with reference to the preferred embodiment thereof, it will be understood by those skilled in the art that various changes in form and detail may be made therein without departing from the spirit and scope of the invention.

What is claimed is:

1. A method for reducing multi-cell signal interferences in a wireless communication network, the method comprising:
dividing an available frequency spectrum into a plurality of channels;
segregating a first wireless communication coverage unit into a first number of geographical segments;
grouping the channels into a second number of channel blocks;
assigning each channel block to at least one of the segregated geographical segments with predetermined priorities such that the channel blocks having a higher likelihood of mutual interference are separated farther apart to minimize the multi-cell signal interferences; and
repeating the above steps for each neighboring wireless communication coverage unit of the first wireless communication coverage unit,
wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship, and wherein the channels are grouped in the same fashion for various wireless communication coverage units or in a wireless-communication-coverage-unit-dependent fashion based on a predetermined permutation scheme.

2. A method for reducing multi-cell signal interferences in a wireless communication network, the method comprising:
dividing an available frequency spectrum into a plurality of channels;
segregating a first wireless communication coverage unit into a first number of geographical segments;
grouping the channels into a second number of channel blocks;
assigning each channel block to at least one of the segregated geographical segments with predetermined priorities such that the channel blocks having a higher likelihood of mutual interference are separated farther apart to minimize the multi-cell signal interferences;
repeating the above steps for each neighboring wireless communication coverage unit of the first wireless communication coverage unit; and
determining a channel power for compensating a path loss of a down link between a base transceiver station and the wireless terminal, thereby ensuring signals received at the wireless terminal to have a signal-to-noise ratio higher than a predetermined value, and
wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship.

3. The method of claim 2 wherein the channel power is determined by using a close or open loop control scheme.

4. A method for reducing multi-cell signal interferences in a wireless communication network, the method comprising:
dividing an available frequency spectrum into a plurality of channels;
segregating a first wireless communication coverage unit into a first number of geographical segments;
grouping the channels into a second number of channel blocks;
assigning each channel block to at least one of the segregated geographical segments with predetermined priorities such that the channel blocks having a higher likelihood of mutual interference are separated farther apart to minimize the multi-cell signal interferences;
repeating the above steps for each neighboring wireless communication coverage unit of the first wireless communication coverage unit; and
determining a channel power for compensating a path loss of an up link between the wireless terminal and a base transceiver station, thereby ensuring signals received at the base transceiver station to have a signal-to-noise ratio higher than a predetermined value, and
wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship.

5. The method of claim 4 wherein the channel power is determined by using a close or open loop control scheme.

6. A method for reducing multi-frequency signal interference in a wireless communication network, the network having a plurality of cells bordering on each other, each cell using a predetermined frequency spectrum for communications therein, the method comprising:
segregating a first cell into a first number of geographical segments;
dividing the predetermined frequency spectrum for the first cell into a plurality of channels;
establishing a channel assignment priority hierarchy for associating one or more channels to each geographical segment of the first cell;
repeating the above three steps for each cell bordering with the first cell; and
assigning channels to a terminal entering a segregated geographical segment of the first cell according to the established channel assignment priority hierarchy,
wherein the channel assignment priority hierarchy for the first cell and its bordering cells assures that the assigned channels are selected from the channels associated with the geographical segment of the first cell in which the terminal locates, and wherein the channels for such a geographical segment are different from the channels of a similarly segregated segment of another wireless cell that immediately borders therewith, and wherein the channels are grouped in the same fashion for various cells or in a cell-dependent fashion based on a predetermined permutation scheme.

7. A method for reducing multi-frequency signal interference in a wireless communication network, the network having a plurality of cells bordering on each other, each cell using a predetermined frequency spectrum for communications therein, the method comprising:
segregating a first cell into a first number of geographical segments;
dividing the predetermined frequency spectrum for the first cell into a plurality of channels;
establishing a channel assignment priority hierarchy for associating one or more channels to each geographical segment of the first cell;
repeating the above three steps for each cell bordering with the first cell;
assigning channels to a terminal entering a segregated geographical segment of the first cell according to the established channel assignment priority hierarchy; and
determining a channel power for compensating a path loss of a down link between a base transceiver station and the terminal, thereby ensuring signals received at the terminal to have a signal-to-noise ratio higher than a predetermined value, and
wherein the channel assignment priority hierarchy for the first cell and its bordering cells assures that the assigned channels are selected from the channels associated with the geographical segment of the first cell in which the terminal locates, and wherein the channels for such a geographical segment are different from the channels of a similarly segregated segment of another wireless cell that immediately borders therewith.

8. The method of claim 7 wherein the channel power is determined by using a close or open loop control scheme.

9. A method for reducing multi-frequency signal interference in a wireless communication network, the network having a plurality of cells bordering on each other, each cell using a predetermined frequency spectrum for communications therein, the method comprising:
   segregating a first cell into a first number of geographical segments;
   dividing the predetermined frequency spectrum for the first cell into a plurality of channels;
   establishing a channel assignment priority hierarchy for associating one or more channels to each geographical segment of the first cell;
   repeating the above three steps for each cell bordering with the first cell;
   assigning channels to a terminal entering a segregated geographical segment of the first cell according to the established channel assignment priority hierarchy; and
   determining a channel power for compensating a path loss of an up link between the terminal and a base transceiver station, thereby ensuring signals received at the base transceiver station to have a signal-to-noise ratio higher than a predetermined value, and
   wherein the channel assignment priority hierarchy for the first cell and its bordering cells assures that the assigned channels are selected from the channels associated with the geographical segment of the first cell in which the terminal locates, and wherein the channels for such a geographical segment are different from the channels of a similarly segregated segment of another wireless cell that immediately borders therewith.

10. The method of claim 9 wherein the channel power is determined by using a close or open loop control scheme.

11. A base station transceiver system for reducing multi-cell signal interferences in a wireless communication network, comprising:
   means for dividing an available frequency spectrum into a plurality of channels;
   means for segregating a first wireless communication coverage unit into a first number of geographical segments;
   means for grouping the channels into the first number of channel blocks; and
   means for assigning each channel block to at least one of the segregated geographical segments with predetermined priorities,
   wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship, and wherein the channels are grouped in the same fashion for various wireless communication coverage units or in a wireless-communication-coverage-unit-dependent fashion based on a predetermined permutation scheme.

12. A base station transceiver system for reducing multi-cell signal interferences in a wireless communication network, comprising:
   means for dividing an available frequency spectrum into a plurality of channels;
   means for segregating a first wireless communication coverage unit into a first number of geographical segments;
   means for grouping the channels into the first number of channel blocks;
   means for assigning each channel block to at least one of the segregated geographical segments with predetermined priorities; and
   means for determining a channel power that compensates a path loss of a down link between a base transceiver station and the wireless terminal, thereby ensuring signals received at the wireless terminal to have a signal-to-noise ratio higher than a predetermined value, and
   wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship.

13. The system of claim 12 wherein the channel power is determined by using a close or open loop control scheme.

14. A base station transceiver system for reducing multi-cell signal interferences in a wireless communication network, comprising:
   means for dividing an available frequency spectrum into a plurality of channels;
   means for segregating a first wireless communication coverage unit into a first number of geographical segments;
   means for grouping the channels into the first number of channel blocks;
   means for assigning each channel block to at least one of the segregated geographical segments with predetermined priorities; and
   means for determining a channel power that compensates a path loss of an up link between the wireless terminal and a base transceiver station, thereby ensuring signals received at the base transceiver station to have a signal-to-noise ratio higher than a predetermined value, and wherein the channels in different channel blocks exhibit no higher mutual interference than the channels in the same channel block, and wherein the channel block assigned for each segregated segment of the first wireless communication coverage unit is different from the channel block assigned for the segregated segment of a second wireless communication coverage unit that immediately borders with the segregated segment of the first wireless coverage unit even if the first and second wireless communication coverage units share the same frequency spectrum, wherein a location of a wireless terminal entering the first wireless communication coverage unit is detected by utilizing one or more segregated access code channels (ACCs) for the segregated geographical segments of the first wireless communication coverage unit to identify the wireless terminal wherein the ACCs and the segments bear a one-to-one relationship.

15. The system of claim 14 wherein the channel power is determined by using a close or open loop control scheme.

* * * * *